United States Patent [19]

Iio et al.

[11] Patent Number: 4,825,336
[45] Date of Patent: Apr. 25, 1989

[54] POWER DISTRIBUTION BOARD WITH IMPROVED MOUNTING ARRANGEMENT FOR CIRCUIT INTERRUPTERS

[75] Inventors: Tukasa Iio; Sumio Egusa, both of Fukuyama, Japan

[73] Assignee: Mitsubishi Denki Kabushiki Kaisha, Japan

[21] Appl. No.: 196,775

[22] Filed: May 18, 1988

Related U.S. Application Data

[63] Continuation of Ser. No. 804,141, Dec. 3, 1985, abandoned.

[30] Foreign Application Priority Data

| Dec. 4, 1984 | [JP] | Japan | 59-184453[U] |
| Feb. 7, 1985 | [JP] | Japan | 60-16821[U] |
| Feb. 7, 1985 | [JP] | Japan | 60-16822[U] |
| Feb. 13, 1985 | [JP] | Japan | 60-20071[U] |

[51] Int. Cl.⁴ .............................................. H02B 1/04
[52] U.S. Cl. ................................... 361/355; 200/294; 200/307; 361/376
[58] Field of Search .................... 361/346–348, 361/353–355, 358, 363, 376; 200/293, 294, 296, 306, 307; 174/67, 72 B, 99 B; 220/3.3, 23.2, 23.4, 23.6

[56] References Cited

U.S. PATENT DOCUMENTS

| 3,263,132 | 7/1966 | Bangert, Jr. ................. 361/354 |
| 3,538,296 | 11/1970 | Michaelson, Jr. ............... 200/168 |
| 3,588,620 | 6/1971 | Wasileski ..................... 317/119 |
| 4,157,582 | 6/1979 | Myers ........................ 361/355 |

FOREIGN PATENT DOCUMENTS 1517913 7/1975 United Kingdom .

Primary Examiner—Gerald P. Tolin
Attorney, Agent, or Firm—Leydig, Voit & Mayer

[57] ABSTRACT

A power distribution board includes a blind cover and main and shunt interrupters. A blind cover has an engaging tab disposed at one end for engaging an edge of the window, and a foldable engaging tab at the other end of the blind cover main body. The foldable tab holds, in cooperation with the engaging tab, the blind cover to the distribution panel board cover. The shunt circuit interrupters are mounted in a side-by-side relationship with an insulating partition wall interposed therebetween. The partition wall is accommodated within recesses in the side surfaces of the interrupters, so that dielectric breakdown does not occur around the gas exhaust ports. One side of the main circuit interrupter is secured to a base plate by the rigidity of a connecting conductor while the other side of the interrupter is secured in a usual manner. The insulating mounting base for the shunt circuit interrupter has a projection and the shunt conductor has a recess formed therein for engaging with the projection, whereby the insulating mounting base is secured to the base plate by the rigidity of the shunt conductor.

6 Claims, 9 Drawing Sheets

FIG. 10
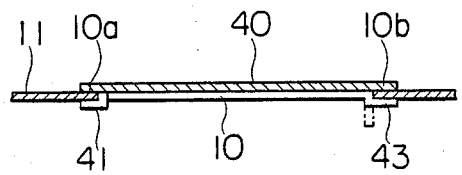
FIG. 11
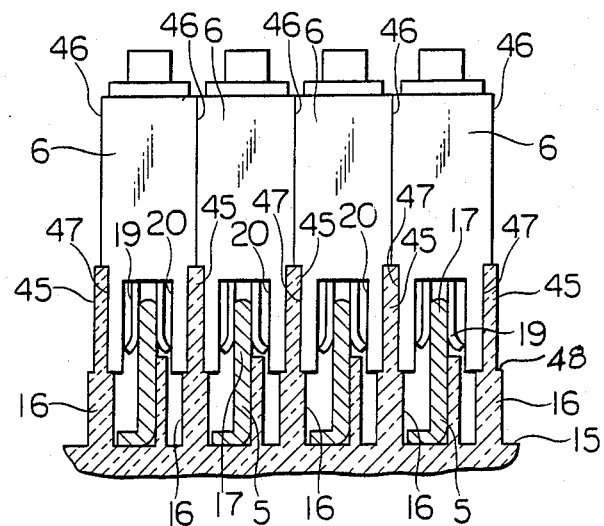
FIG. 12
FIG. 13
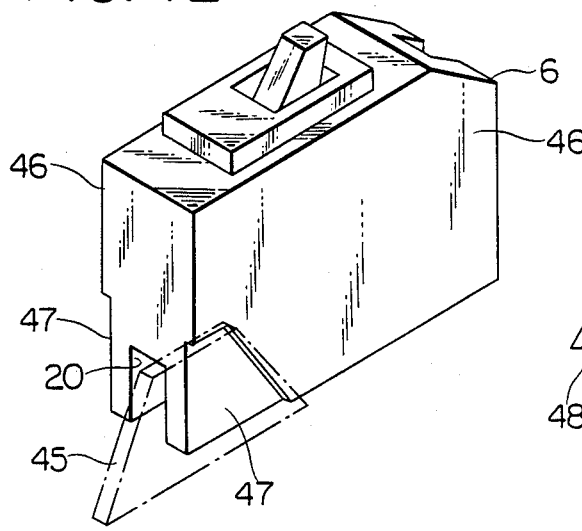

FIG. 14
FIG. 15
FIG. 17
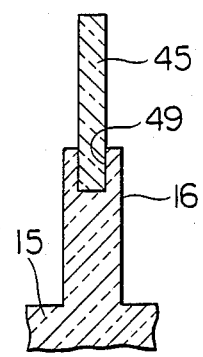
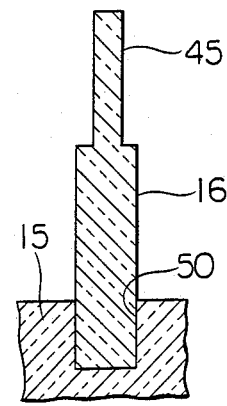
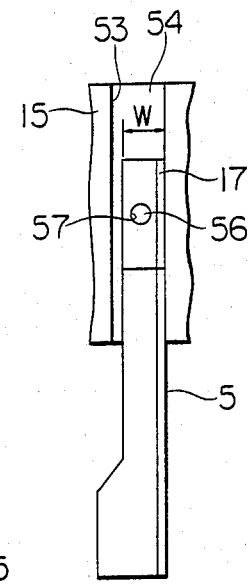
FIG. 16
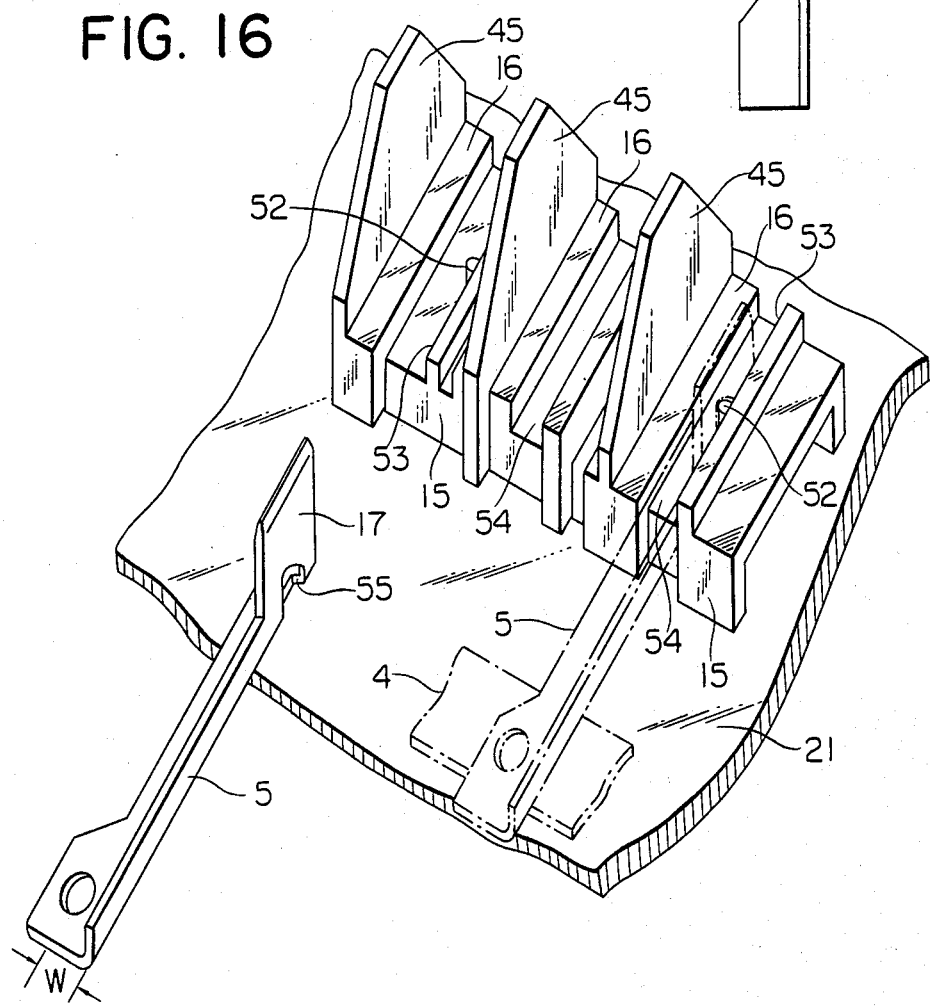

POWER DISTRIBUTION BOARD WITH IMPROVED MOUNTING ARRANGEMENT FOR CIRCUIT INTERRUPTERS

This application is a continuation of application Ser. No. 804,141 filed Dec. 3, 1985, now abandoned.

BACKGROUND OF THE INVENTION

This invention relates to a power distribution arrangement and more particularly to a power distribution board including a housing cover, an insulating mounting base, and means for securing circuit interrupters to the distribution board.

FIG. 1 is an electrical connection diagram of a power distribution arrangement including main circuit interrupters and shunt circuit interrupters. In FIG. 1, 1 are main circuit interrupters, 2 are source side conductors connected to one side of the main circuit interrupters 1, 3 are connecting conductors connected to the other side of the main circuit interrupters 1, 4 are bus bars connected to the connecting conductors 3 by a suitable means (not shown), 5 are shunt conductors connected to the bus bars 4, 6 are shunt circuit interrupters, and L are loads. The connecting conductors 3 are usually made of rigid material, and the source side conductors 2 are usually flexible.

FIGS. 2 and 3 illustrate a conventional distribution board in which the arrangement shown in FIG. 1 is housed. It is noted that in the prior art power distribution housing, a window formed in a housing cover for providing access to the shunt circuit interrupters is made large for the purpose of accommodating the maximum number of shunt circuit interrupters that is expected to be employed. Therefore, some portions of the window which are not utilized by the shunt circuit interrupters are often exposed. This subjects the customers to great dangers and, therefore, for safety reasons, these open portions of the window must be closed when the shunt circuit interrupters are not in place.

To solve this problem, according to the conventional design shown in FIGS. 2 and 3, a window 10 formed in a housing cover 11 is provided with concealed covers 12 which are integrally formed so that they can be individually punched through each time an interrupter is installed. The concealed covers 12 are so dimensioned that they correspond to the size of a single shunt circuit interrupter 6. While there are two concealed covers 12 in the illustrated design, the number of concealed covers 12 may vary in accordance with the user's needs and utilization.

Since it is necessary with the above-described arrangement to prepare various kinds of housing covers 11 having different numbers of concealed covers 12 and to form the concealed cover 12 integrally with the window 10, a time consuming and troublesome operation for punching through the concealed covers 12 is required.

Another problem in the prior art distribution arrangement surfaces in view of the structure of a conventional shunt circuit interrupter 6, which is shown in FIGS. 4 and 5. An insulating mounting base 15 has support beds 16 disposed at predetermined intervals, and terminals 17 of the shunt conductors 5 extending between the support beds 16. On the other hand, each shunt circuit interrupter 6 includes terminals 19 adapted to be connected to the terminal 17 of the shunt conductor 5. The shunt circuit interrupters 6 are mounted on the support beds 16 in an intimate side-by-side relationship, and their terminals 19 are connected to the terminals 17 of the shunt conductors 5. Exhaust ports 20 are provided on the underside of the shunt circuit interrupters 6.

As previously intended, the shunt circuit interrupter 6 operates when an electric current flowing therethrough exceeds a predetermined value so as to break power supply from the source to the load L. During the interruption, an electric arc is generated and the surrounding gas is ionized. The ionized gas is exhausted from the exhaust ports 20 and some portion of the gas enters into the gap between the bottom of the shunt circuit interrupter 6 and the support bed 16.

Since the shunt circuit interrupters are assembled side by side to form an assembly as shown in FIG. 5, the dielectric strength of the surrounding gas is decreased by the ionized gas and therefore an insulation breakdown often occurs around the exhaust ports or through the bottom portion between the adjacent shunt circuit interrupter.

FIG. 6 is a perspective view of a mounting board for supporting various circuit interrupter assemblies of a power distribution arrangement as shown, 21 is a base plate, 1 is a main circuit interrupter, 3 are connecting conductors connected to the output side terminals of the main circuit interrupter 1, 4 are bus bars connected to the connecting conductors 3 and secured to the base plate 21. In the illustrated example, the bus bars 4 are secured to the base plate 21 in a spaced relationship and individually connected at one end to the connecting conductors 3 by screws 22 and at the other end to an end supporting block 23 by screws 24. Shunt conductors 5 are secured at one end to the bus bars 4 by screws 25 and having terminals 17 at the other end for connecting to shunt circuit interrupters b (not shown in FIG. 6). Insulating mounting bases 15 are provided supporting the shunt circuit interrupters 6 (not shown) and they each have a groove 26 for receiving therein the shunt conductor 5. Tabs 27 are integrally formed to project from the insulating mounting base 15, and are screwed down to the base plate 21 by screws 28, thereby securing the insulating mounting base 15 to the base plate 21.

Since the insulating mounting base 15 of the conventional design is secured in the manner as above described and the tabs 27 must be made to project from the insulating mounting base 15, not only are the tabs 27 often damaged, but also the tabs 27 must be screwed to the base plate 21, resulting in poor assembling efficiency.

Referring now to FIG. 7, mounting structure of the main circuit interrupter 1 will be described. In the figure, 21 is a base plate on which the main circuit interrupter 1 is to be mounted and 30,31 are mounting bases disposed between the bottom of the main circuit interrupter 1 and the base plate 21 and secured to the base plate 21 by a suitable means such as screws 32. The mounting bases 30 and 31 extend in the direction of the width of the main circuit interrupter 1 or in the direction in which the interrupters main 1 are arranged in a side-by-side relationship.

Mounting pawls 33 and 34 project from the mounting bases 30 and 31. The main circuit interrupter 1 is secured to the mounting bases 30 and 31 by inserting the mounting pawls 33, 34 into for engagement with recessed portions 35 and 36 formed at both longitudinal end faces of the main circuit interrupter 1.

Since the conventional main circuit interrupter 1 is mounted on the distribution board as above described, the mounting pawls 33 and 34 must be provided on the respective mounting bases 30 and 31 in order to mount the main circuit interrupter 1 to the mounting bases 30 and 31, and the recessed portions 35,36 must be formed in the end faces of the main circuit interrupter 1 for receiving the engaging mounting pawls 33 and 34. Therefore, the structure is not only complex and expensive, but the efficiency in assembly is low because the mounting pawls 33 and 34 must be brought in engagement with both ends of the main circuit interrupter 1.

SUMMARY OF THE INVENTION

Accordingly, an object of the present invention is to provide a power distribution board with improved cover and mounting arrangement which is free from the above described drawbacks of conventional power distribution boards.

Another object of the present invention is to provide a cover for a power distribution board which can easily be attached to and detached from a housing for installing the shunt circuit interrupters.

Still another object of the present invention is to provide a power distribution board having a shunt circuit interrupter assembly in which no insulation breakdown occurs between adjacent shunt circuit interrupters during interruption or in which the risk of breakdown is at least reduced.

A further object of the present invention is to provide a power distribution board including an insulating mounting base for supporting a purality of shunt circuit interrupters in a side by side relationship which requires no engaging tabs used in the conventional design to improve assembling efficiency.

Still another object of the present invention is to provide a mounting arrangement for main circuit interrupters which is simple in structure and which can be easily assembled.

With the above objects in view, there is provided a cover for a housing for a power distribution board, the cover having a window for providing access to circuit interrupters such as a main circuit interrupter and a plurality of shunt circuit interrupters mounted on the board to extend between opposite side edges of the window, and a plurality of window blinds removably mounted in the window. Each of the blinds includes a main body with a width dimension substantially corresponding to the width of a single shunt circuit interrupter and a length dimension slightly larger than the length of a single shunt circuit interrupter so that opposite ends of the main body of each blind overlap both side edges of the window and engage one surface of the cover. The main body of each of the blinds further includes an engaging tab at one of the opposite ends extending to engage the opposite surface of the cover adjacent one side edge of the window, and a foldable tab at the other of the opposite ends of the main body foldable around the other side edge of the window to engage the opposite surface of the cover adjacent thereto to secure the blind in the window and unfoldable from the opposite surface of the cover to allow a secured blind to be removed from the window. In keeping with an aspect of the present invention, there is provided a power distribution board including an insulating mounting base for supporting a plurality of shunt circuit interrupters in a side-by-side relationship, each of the shunt circuit interrupters having recessed portions on the outer side surfaces and extending upwardly from the bottom of each circuit interrupter, recessed portions on the outer side surfaces of adjacent shunt circuit interrupters providing a space extending upwardly from the bottoms thereof. The insulating mounting base includes upstanding insulating partition walls projecting above the board to fit into the space between adjacent shunt circuit interrupters supported on the mounting base and sandwiched therebetween to isolate ionized gas from an exhaust port of one of the shunt circuit interrupters from flowing to another in the event of arcing upon operation thereof and intervening between the bottoms of adjacent shunt circuit interrupters and reducing the risk of insulation breakdown at the bottoms of the shunt circuit interrupters.

In carrying out the present invention, there is provided a power distribution board comprising a base plate, an insulating mounting base, a main circuit interrupter mounted on the base plate, a shunt circuit interrupter assembly having a plurality of shunt circuit interrupters mounted on the insulating mounting base, a plurality of bus bars on the base plate for connecting the main circuit interrupter to the shunt circuit interrupter assembly, and a plurality of shunt conductor means for connecting the shunt circuit interrupter assembly to the bus bars. The insulating base includes transverse grooves for receiving the shunt conductor means, each of the shunt conductor means having a recess formed therein, an element on the insulating mounting base projecting into each of the transverse grooves for engaging with a recess in one of the shunt conductor means received therein, whereby, when the shunt conductor means are secured to the base plate and received within the shunt conductor receiving grooves, the insulating mounting base is fixed relative to the shunt conductor means in the direction perpendicular to the grooves to secure the insulating mounting base to the base plate by the shunt conductor means. In accordance with the present invention, there is provided a power distribution board comprising a base plate and a mounting base means on the base plate, a main circuit interrupter mounted on the base means and connected at one side to a source conductor, a shunt circuit interrupter mounted on the base plate adjacent the other side of the main circuit interrupter, a mounting pawl projecting from the mounting base means into a recessed portion formed in the one side of the main circuit interrupter to hold the one side against the mounting base means, and a rigid connecting conductor means mounted on the base plate and connecting the other side of the main circuit interrupter to the shunt circuit interrupter. The rigid connecting conductor means exerts downward pressure on the main circuit interrupter to hold the other side thereof against the mounting base means.

BRIEF DESCRIPTION OF THE DRAWINGS

The present invention will become more readily apparent from the following detailed description of the preferred embodiments of the invention taken in conjunction with the accompanying drawings, in which:

FIG. 10 is a sectional view taken along the line X—X of FIG. 9;

FIG. 11 is a sectional view of the shunt circuit interrupters of one embodiment of the present invention;

FIG. 12 is a perspective view of the shunt circuit interrupter of the embodiment shown in FIG. 1;

FIG. 13 is a side view of a portion of the insulating partition wall for explaining the preferred form of the present invention;

FIGS. 14 and 15 are sectional views showing modified embodiments of the present invention;

FIG. 16 is an exploded perspective view showing the manner in which the mounting base is attached on the insulating base;

FIG. 17 is a plan view showing a modification of the embodiment shown in FIG. 16;

DETAILED DESCRIPTION OF THE PREFERRED EMBODIMENTS

Figure 8:
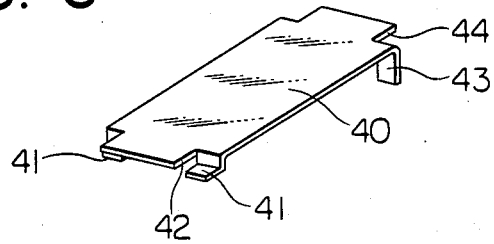
FIG. 8 is a perspective view of the blind cover constructed in accordance with the present invention.
Figure 9:
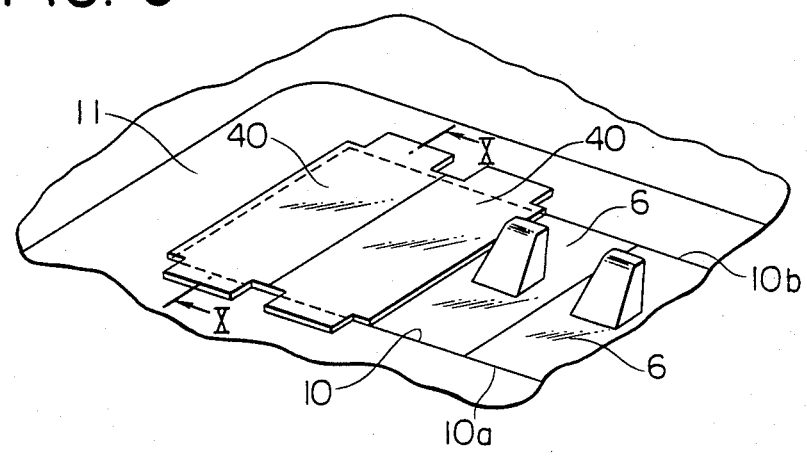
FIG. 9 is a fragmental perspective view showing the manner in which the blind cover of the present invention is attached to the window of the housing cover.

FIGS. 8-10 show one embodiment of a cover for a housing for a power distribution board having a plurality of window blinds according to the present invention. Each window blind which includes a main body 40 is made of a single metallic plate having a width dimension substantially corresponding to the width of a single shunt circuit interrupter and a length dimension slightly larger than the length of a single shunt circuit interrupter 6 so that opposite ends of the main body 40 overlap both side edges 10a and 10b of the window 10 and engage one surface of a cover 11. An engaging tab 41 is disposed at one end of the blind cover main body 40 and formed by cutting one portion of one end of the blind cover main body 40 along a cutting line 42, and this cut portion is folded twice into different directions at the base portion and at the center portion thereof. A foldable engaging tab 43 is disposed on the other end of the cover 40 formed by cutting a portion of the end of the blind cover main body 40 along a cutting line 44 by folding this cut portion at its base.

When it is desired to attach or detach the blind main body 10 with respect to the window 10, it is noted that the outer housing cover 11 must first be removed from the housing main body (see FIG. 9). As shown in FIGS. 8-10, the engaging tabs 41 extend to engage the opposite surface of the cover 11 adjacent one side edge 10a of the window 10, and the foldable engaging tab 43 is inserted into the window 10. Since at this time the foldable engaging tab 43 extends normal to the main body 40 as shown by the dot-and-dash lines in FIG. 10, the foldable engaging tab 43 must be folded around the other side edge 10b of the window 10, as shown by the solid lines, to engage the opposite surface of the cover 11 adjacent thereto to secure the blind main body 40 in the window 10. When it is desired to detach a blind main body 40 from the housing cover 11 in order to install an additional shunt circuit interrupter 6, the outer housing cover 11 is detached from the housing base and the foldable engaging tab 43 is unfolded from the opposite surface of the housing cover 11 to allow the secured blind main body 40 to be removed from the window 10.

As shown in the above embodiment, the engaging tab 41 and the foldable engaging tab 43 are formed from the single metallic plate of main body 40, so that manufacture is simple and the cost is lowered.

While two engaging tabs 41 and two foldable engaging tabs 43 are provided at the opposite ends of the end portion of the blind main body 40 in the above embodiment, the engaging tabs may equally be disposed at the center of the end portion of the blind cover main body 40.

In keeping with an aspect of the present invention, an embodiment showing a power distribution board is described with reference to FIGS. 11-15. As shown in FIG. 11, which is a sectional front view, a power distribution board including an insulating mounting base for supporting a plurality of shunt circuit interrupters 6 has an upstanding insulating partition wall 45 integrally formed on a support bed 16 of the insulating mounting base 15 and has a symmetrical trapezoidal shape (illustrated in FIGS. 12 and 13). The shunt circuit interrupters 6 are supported in a side-by-side relationship on the insulating mounting base 15, each having recessed portions 47 on outer side surfaces 46 and extending upwardly from the bottom of each circuit interrupter 6. The recessed portions 47 provide a space extending upwardly from the bottoms thereof and having a shape and size capable of accommodating one longitudinal half of the insulating partition wall 45. Thus, when the shunt circuit interrupters 6 are assembled as shown in FIGS. 11 and 12 the upstanding insulating partition walls 45 project above the support bed 16 to fit into the space between adjacent shunt circuit interrupters sandwiched therebetween.

When the shunt circuit interrupters 6 are assembled as above described, ionized gas from an exhaust port 20 of one of the shunt circuit interrrupters 6 is isolated from flowing to another adjacent shunt circuit interrupter 6 in the event of electric arcing intervening between the bottoms of adjacent shunt circuit interrupters upon operation thereof to significantly reduce the risk of insulation breakdown at the bottoms of the circuit interrupters 6. In order that the insulation breakdown through the bottom portion of the shunt circuit interrupter 6 and the support bed 16 be effectively prevented or the risk of the breakdown be significantly reduced, the depth of the recessed portions 47 on the outer side surfaces 46 of each of the shunt circuit interrupters 6 are about one half of the thickness of each of the insulating partition walls 45. The length l along which the lower edge 48 projects within the recessed portion 47 should also be arranged to extend beyond the terminal 17 of the shunt conductor 5 at which the insulation breakdown may easily occur.

As described above, by selecting the depth of the recessed portions 47 to be one half of thickness of the insulating partition wall 45, the shunt circuit interrupter 6 can be arranged in an intimate side-by-side relationship, without increasing the size of the assembly.

In the above embodiment, it is shown that the insulating partition walls 45 are equally spaced from each other with only one-half the thickness at the upper ends (as compared to that at the lower ends) so as to allow a shunt circuit interrupter to be accommodated within the recessed portions 47 and another shunt circuit interrupter of the same type to be mounted adjacent thereto. Furthermore, the terminal 17 of the shunt conductor 5 is designed to project into the shunt circuit interrupter 6 so as to allow connections to another shunt circuit interrupter in a double-row arrangement. However, the present invention is not limited to the assembly of such double-row arrangement.

While the insulating partition walls 45 is integrally formed on the support bed 16 in the above-described embodiment, the partition walls may be fitted into grooves of channels 49 formed in the support bed 16 as shown in FIG. 14, or the insulating partition wall 45 integrally formed with the support bed 16 may be fitted into grooves or channels 50 formed in the insulating mounting base 15 as shown in FIG. 15. Of course, the present invention may equally be applied to the assembly in which no support bed 16 is used.

Figure 1:
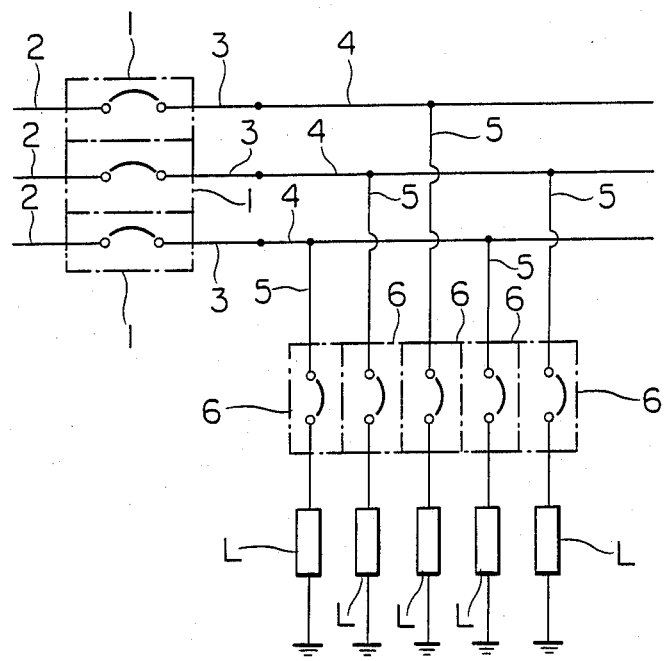
FIG. 1 is an electrical connection diagram of the main circuit interrupters.
Figure 2:
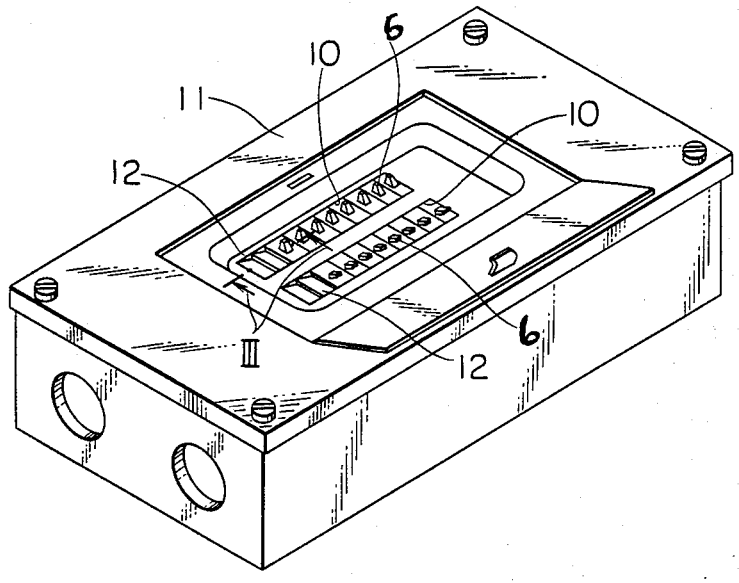
FIG. 2 is a perspective view showing one example of a conventional power distribution board.
Figure 3:
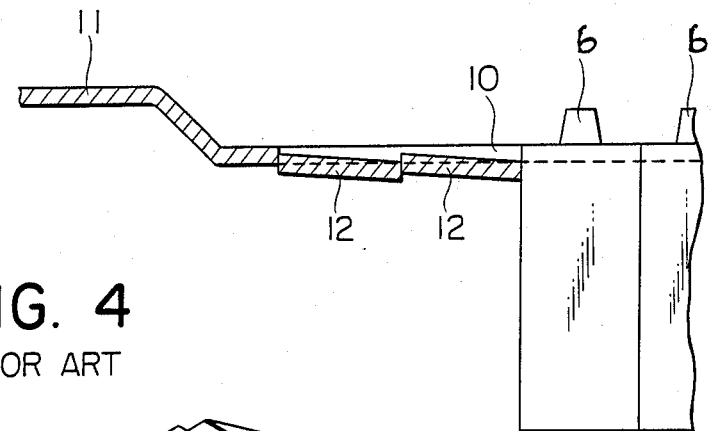
FIG. 3 is a sectional view taken along the line V—V of FIG. 2.
Figure 4:
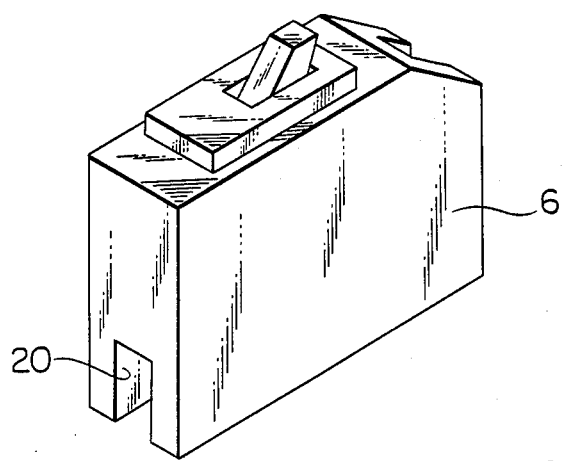
FIG. 4 is a perspective view of a conventional shunt circuit interrupter.
Figure 5:
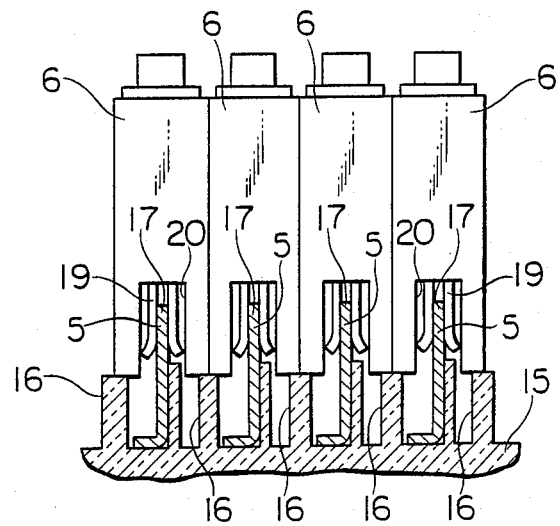
FIG. 5 is a sectional front view of a conventional shunt circuit interrupter assembly.
Figure 6:
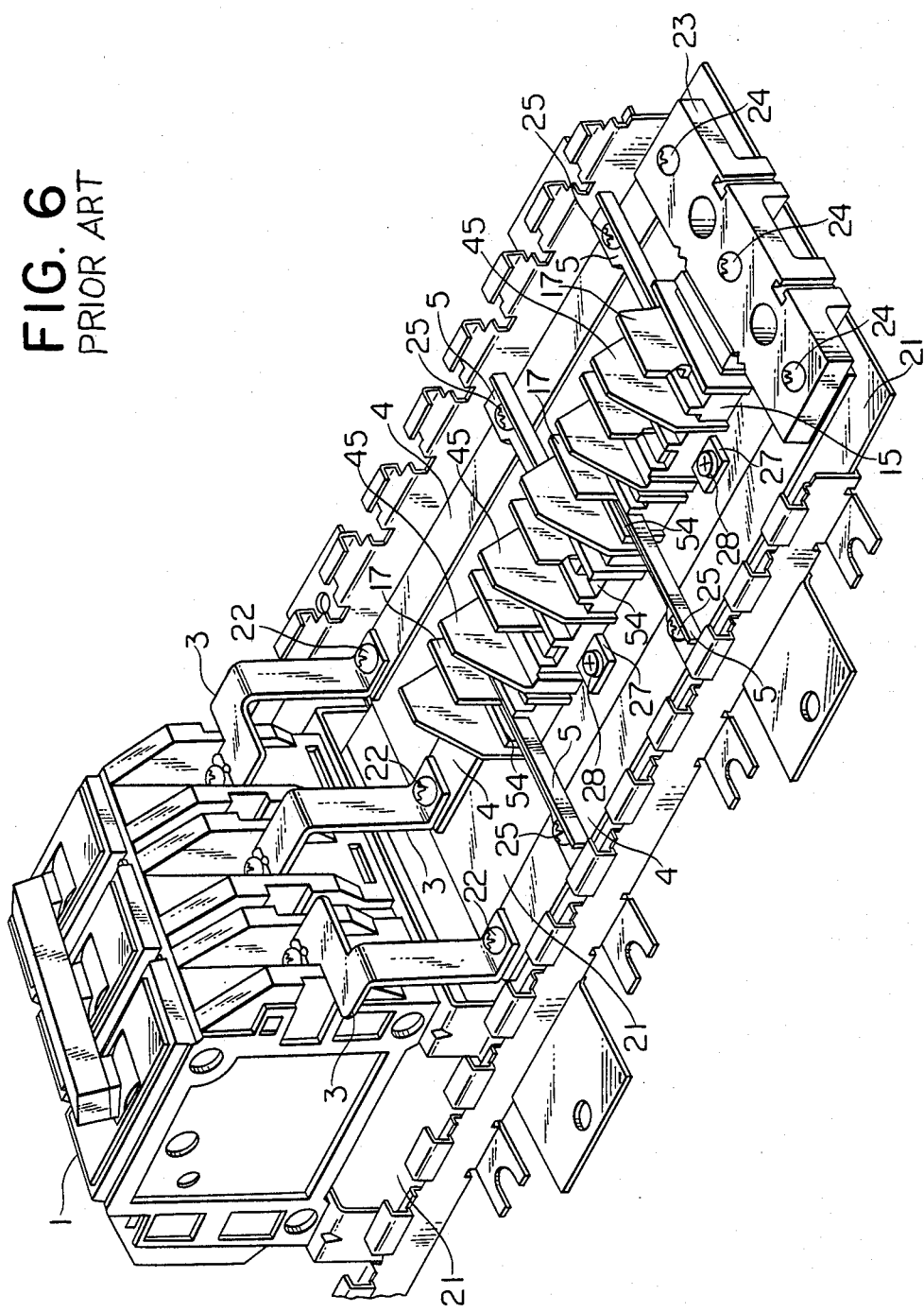
FIG. 6 is a perspective view of a conventional arrangement for mounting the mounting base on the base plate.

FIG. 16 is an exploded perspective view of another embodiment of the present invention showing a section of an insulating mounting base 15. In the figure, 52 is a semicircular column-like projection element integrally formed on a side wall 53 of a shunt conductor means receiving groove 54, 55 is a recess formed in a shunt conductor means, herein shown as the shunt conductor 5, which is provided at the position for engagement with the projecting element projection 52 when the shunt conductor 5 is mounted to the bus bar 4. The width W of a portion of the shunt conductor 5 to be received in the shunt conductor means receiving groove 54 is made substantially equal to the width of the receiving groove 54. The dot-and-dash line in the figure shows the state in which the shunt conductor 5 shown by the solid line is secured in the predetermined position, one end of the shunt conductor 5 being fixed by the screw 25 (refer to FIG. 6) to the bus bar 4 which is secured to the base plate 21. In this portion the projecting element 52 is in engagement with the recess 55 of the shunt conductor 5.

When the shunt conductor 5 is thus secured, the shunt conductor 5 holds the insulating mounting base 15 onto the base plate 21 to prevent upward movement. Also, since the recess 55 of the shunt conductor 5 engages the projection 52 within the shunt conductor receiving groove 54, the insulating mounting base 15 is secured in the longitudinal direction of the shunt conductor 5. Also, since the width W of the portion of the shunt conductor 5 to be received within the shunt conductor means receiving groove 54 is made substantially equal to the width of the receiving groove 54, the insulating mounting base 15 is engaged to be flexed relative to the shunt conductor 5 in a direction perpendicular to the transverse receiving grooves 54. Therefore, there is no need for tabs 27 to be integrally formed on the insulating mounting base 15, and there is no need for tabs 27 to be screwed onto the base plate 21, while the insulating mounting base 15 can still be secured to the base plate 21.

Another embodiment of the present invention is shown in FIG. 17. In this embodiment, the projecting element is formed in the bottom of the shunt conductor receiving groove 54 as a column-like member 56, and the recess in the shunt conductor 5 is instead formed as an opening 57 into which the column-like member 56 is snugly fitted. By fitting the projection 56 into the opening 57, the insulating mounting base 15 is fixed relative moving to the shunt conductor 5.

While the bus bars 4 are secured to the base plate 21 in a spaced relationship relative to the base plate 21 in the above embodiment, they may equally be secured to the base plate 21 in a contacting relationship thereto. Also, the projecting element 52 or 56 may be provided on the side wall on the opposite side of the receiving groove 54 and the corresponding recess may be formed in the edge on the opposite side of the shunt conductor 5.

Figure 7:
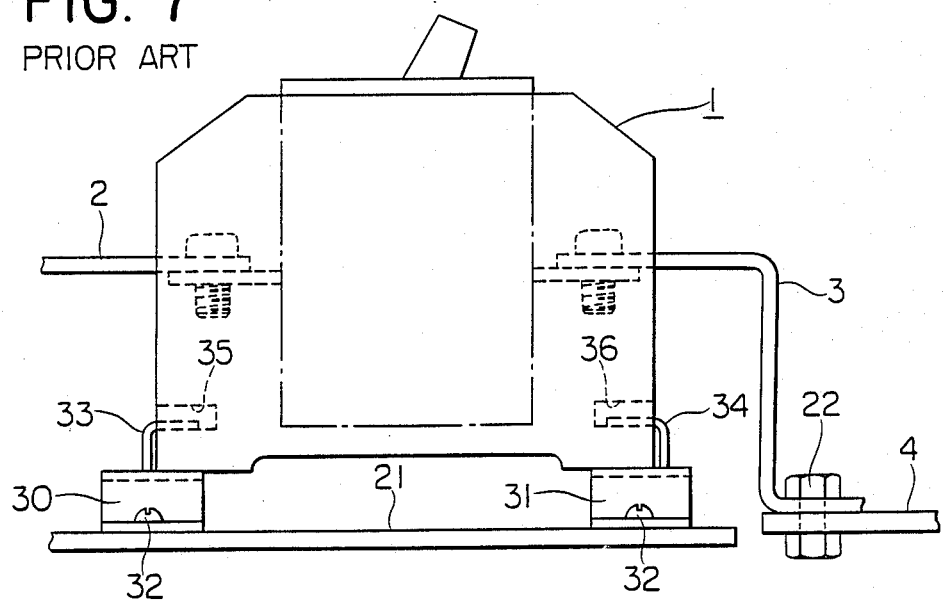
FIG. 7 is a side view of a conventional main circuit interrupter.
Figure 18:
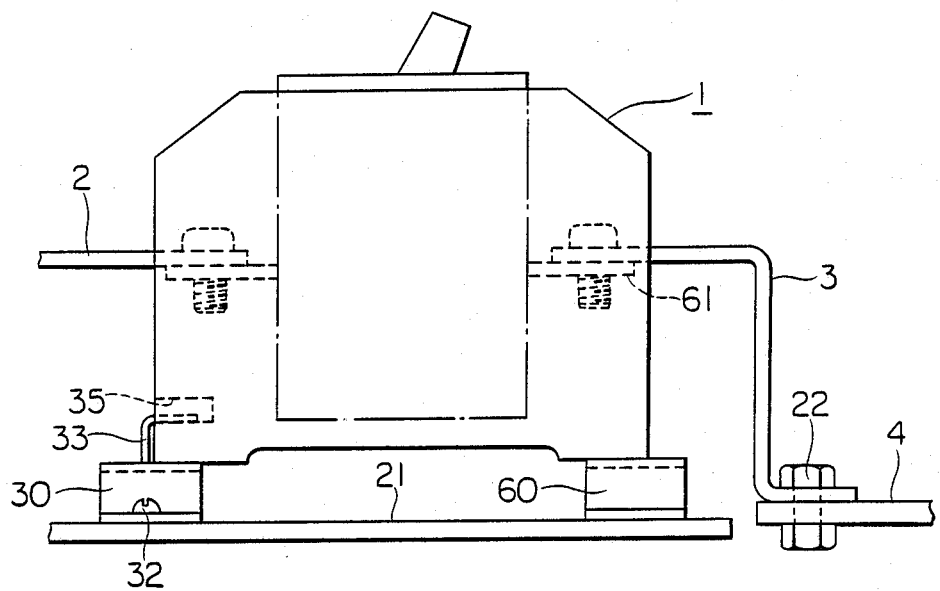
FIG. 18 is a side view showing the manner in which the main circuit interrupter is mounted in accordance with the present invention.
Figure 19:
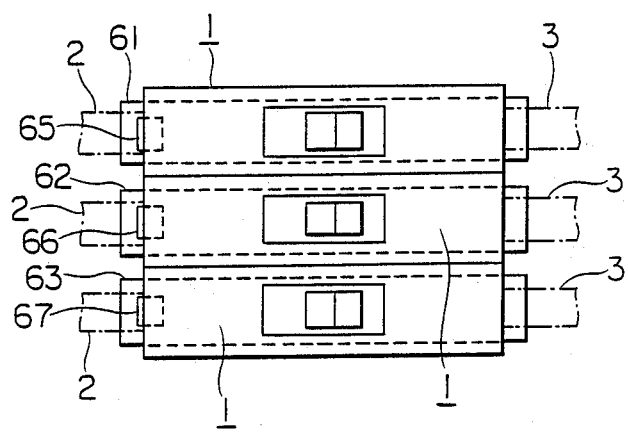
FIG. 19 is a plan view of another embodiment of the present invention.

FIG. 18 is still another embodiment of the present invention. As seen from the figure, the side of the main circuit interrupter 1 on which the source side conductor 2 is provided is secured to a mounting base 30 in the manner similar to the conventional design shown in FIG. 7. A mounting pawl 33 provided on a mounting base herein shown the mounting base 30 is projects into and engages with a recessed portion 35 formed in one side of the main circuit interrupter 1 to hold it against the mounting base 30. The other side of the main interrupter 1 to which the connecting conductor 3 is connected is held on the mounting base 60 under pressure exerted by a rigid connecting conductor means herein shown as the connecting conductor 3 which is electrically and mechanically connected to the terminal 61 of the main circuit interrupter 1. For this purpose, the dimensions of the connecting conductor 3 are selected so as to exert a downward pressure on the main circuit interrupter 1 to hold the other side thereof against the mounting base 60 when it is mechanically and electrically connected. With this arrangement, the recessed portion 36 and the mounting pawl 34 on the side of the connecting conductor 3 of the conventional design become unnecessary, resulting in a simple structure and improved assembling efficiency. Also, since the pressure holding structure is employed, the screw 32 for securing the mounting base 31 to the base plate 21 may be omitted.

While the mounting bases 30 and 60 are shown as extending in the direction of width of the main circuit interrupter 1 in the above embodiment, the mounting bases 30 and 60 may be integral members extending over the entire bottom of the main circuit interrupter 1, or they may be individually provided for the main circuit interrupter 1 for each of three phases in the longitudinal direction as shown in 61, 62 and 63. Mounting pawls 65, 66 and 67 are provided on the mounting base 61, 62 and 63.

As has been described, the present invention has the advantageous effect that window blinds can be easily attached to and detached from the housing cover for accommodating additional shunt circuit interrupters.

Also according to the present invention, since an insulating partition wall is mounted on an insulating mounting base, and the insulating partition wall isolates the shunt circuit interrupters and extends outwardly from an exhaust port of the shunt circuit interrupter, the dielectric breakdown between the shunt circuit interrupters is effectively prevented or the risk of such dielectric breakdown is significantly reduced, and moreover, since a recessed portion for receiving the insulating partition wall therein is formed in the side surfaces of the shunt circuit interrupter, the overall dimension of the circuit interrupter assembly is not increased by the size of the insulating partition walls.

The tabs used in the conventional design are not necessary and therefore the problem of the tabs being damaged is eliminated, and the need for tabs to be screwed down also becomes unnecessary so that the assembly efficiency of the insulating mounting base is improved.

Further, since the connecting conductor side of the main circuit interrupter is held on the mounting base under pressure by the rigidity of the connecting conductor itself, the structure is simple and the mounting of the main circuit interrupter is improved.

What is claimed is:

1. A power distribution board including an insulating mounting base supporting a plurality of shunt circuit interrupters in a side-by-side relationship, each of said shunt circuit interrupters having recessed portions on outer side surfaces and extending upwardly from the bottom of each circuit interrupter, recessed portions on the outer side surfaces of adjacent shunt circuit interrupters being free of any projections and providing a space extending outwardly from the bottoms thereof, said insulating mounting base having integral upstanding insulating partition walls including a given thickness and projecting above said mounting base and fitting into the space between adjacent shunt circuit interrupters supported on said mounting base, the recessed portions on the outer side surfaces of adjacent shunt circuit interrupters having a depth equal to one-half the thickness of a partition wall such that the partition wall snugly slides into the space between adjacent circuit interrupters and is sandwiched therebetween to isolate ionized gas from an exhaust port of one of the shunt circuit interrupters from flowing to another in the event of arcing upon operation thereof and intervenes between the bottoms of adjacent shunt circuit interrupters so as to reduce the risk of insulation breakdown at the bottoms of the shunt circuit interrupters.

2. A power distribution board as claimed in claim 1 wherein said insulating mounting base includes channels, and said insulating partition walls are respectively fitted into said channels.

3. A power distribution board as claimed in claim 1 wherein said insulating mounting base has a support bed, and further comprising shunt conductors including terminals extending upwardly from said support bed through the bottoms of shunt circuit interrupters mounted on said base in engagement with terminals of said shunt circuit interrupters, each of said insulating partition walls having a lower edge projecting beyond said terminals of said shunt conductors to reduce the risk of insulation breakdown at the bottoms of the circuit interrupters.

4. A power distribution board comprising a base plate, an insulating mounting base, a main circuit interrupter mounted on said base plate, a shunt circuit interrupter assembly having a plurality of shunt circuit interrupters mounted on said insulating mounting base, a plurality of bus bars on said base plate connecting said main circuit interrupter to said shunt circuit interrupter assembly, and a plurality of shunt conductor means connecting said shunt circuit interrupter assembly to said bus bars, said insulating base having transverse grooves receiving said shunt conductor means, each of said shunt conductor means having a recess formed therein, an element on said insulating mounting base projecting into each of said transverse grooves for engaging with said recess in one of said shunt conductor means received therein, said projecting element being integrally formed on one of two side walls of the respective shunt conductor means receiving groove whereby, with said shunt conductor means being secured to said base plate and received within said shunt conductor receiving grooves, said insulating mounting base is fixed relative to said shunt conductor means in the direction perpendicular to the grooves to secure said insulating mounting base to said base plate by said shunt conductor means.

5. A power distribution board as claimed in claim 4 wherein the width of a portion of said shunt conductor means received in one of said shunt conductor means receiving grooves is substantially equal to the width of the one shunt conductor means receiving groove.

6. A power distribution board as claimed in claim 4 wherein said projecting element is a column-like member provided in the bottom of a shunt conductor means receiving groove, and said recess in said shunt conductor means is an opening into which said column-like member is inserted.

* * * * *